United States Patent
Huang et al.

(10) Patent No.: US 8,988,788 B2
(45) Date of Patent: Mar. 24, 2015

(54) ZOOM LENS

(71) Applicants: Sintai Optical (Shenzhen) Co., Ltd., Shenzhen, Guandong Province (CN); Asia Optical International Ltd., Tortola (GB)

(72) Inventors: Duen-Kwei Huang, Taichung (TW); Ming-Chih Chang, Taichung (TW)

(73) Assignees: Sintai Optical (Shenzhen) Co., Ltd., Shenzhen, Guandong Province (CN); Asia Optical International Ltd., Tortola (VG)

( * ) Notice: Subject to any disclaimer, the term of this patent is extended or adjusted under 35 U.S.C. 154(b) by 9 days.

(21) Appl. No.: 14/071,799

(22) Filed: Nov. 5, 2013

(65) Prior Publication Data
US 2014/0204469 A1    Jul. 24, 2014

(30) Foreign Application Priority Data
Jan. 21, 2013   (TW) .............. 102102170 A

(51) Int. Cl.
| G02B 7/04 | (2006.01) |
| G02B 15/14 | (2006.01) |
| G02B 7/10 | (2006.01) |
| G02B 7/02 | (2006.01) |

(52) U.S. Cl.
CPC .. G02B 7/04 (2013.01); G02B 7/10 (2013.01); G02B 7/02 (2013.01)
USPC .......................................... 359/703; 359/694

(58) Field of Classification Search
CPC ............... G02B 7/02; G02B 7/04; G02B 7/10
USPC .................... 359/694, 703, 817, 819
See application file for complete search history.

(56) References Cited

U.S. PATENT DOCUMENTS

| 7,097,367 | B2 * | 8/2006 | Nomura ................. 396/349 |
| 8,379,330 | B2 * | 2/2013 | Sasaki .................. 359/817 |
| 8,582,024 | B2 * | 11/2013 | Mori et al. ............ 348/373 |
| 8,891,175 | B2 * | 11/2014 | Nomura ................. 359/694 |

FOREIGN PATENT DOCUMENTS

TW        200708792 A     3/2007

OTHER PUBLICATIONS

English Abstract translation of TW200708792 (Published Mar. 1, 2007).

* cited by examiner

*Primary Examiner* — David N Spector
(74) *Attorney, Agent, or Firm* — McClure, Qualey & Rodack, LLP

(57) ABSTRACT

A zoom lens includes an external frame, a rotary shaft, an internal frame, a lens group and a spring. The internal frame is connected to the external frame via the rotary shaft, so that the internal frame is rotatable relative to the external frame. The lens group is fixed in the internal frame. The spring comprises a deformation part and two extension parts extended from the deformation part, wherein one extension part is propped against the internal frame and inclined at an acute angle relative to the rotary shaft, and the other extension part is propped against the external frame.

6 Claims, 3 Drawing Sheets

ZOOM LENS

BACKGROUND OF THE INVENTION

1. Field of the Invention

The invention relates to a zoom lens, and in particular relates to a zoom lens capable of preventing a lens group from lateral movements in a collapsing operation.

2. Description of the Related Art

In recent years, portable electronic products and lenses applied therewith have been miniaturized and lightened to satisfy users' requirements on portability and operational conveniences.

A conventional zoom lens generally includes a plurality of lens groups which are capable of performing various operations such as zooming and focusing. When the zoom lens is retracted (in a collapsing operation), one of the lens groups (e.g., the third lens group) is moved along an optical axis, contacted by a stop to rotated, and leaves a space for other lens groups to enter, thereby attaining the purpose of miniaturizing the zoom lens.

In operation, however, the third lens group in rotation is susceptible to lateral movements due to a clearance between the internal and external frames which are utilized to support the third lens group. As a result, the optical axis deviates from the preset position and the whole optical performance of the zoom lens is significantly influenced.

BRIEF SUMMARY OF THE INVENTION

To address the shortcomings discussed, the invention provides a zoom lens which includes an external frame, a rotary shaft, an internal frame, a lens group and a spring. The internal frame is connected to the external frame via the rotary shaft, so that the internal frame is rotatable relative to the external frame. The lens group is fixed in the internal frame. The spring includes a deformation part and two extension parts extended from the deformation part, in which one extension part is propped against the internal frame and inclined at an acute angle relative to the rotary shaft, and the other extension part is propped against the external frame.

Alternatively, a zoom lens of the invention includes an external frame, a rotary shaft, an internal frame, a lens group and a spring. The internal frame is connected to the external frame via the rotary shaft, so that the internal frame is rotatable relative to the external frame. The lens group is fixed in the internal frame. The spring includes a deformation part and two extension parts extended from the deformation part, in which one extension part is propped against the external frame and inclined at an acute angle θ relative to the rotary shaft, and the other extension part is propped against the internal frame.

With the configuration of the acute angle included between the extension part of the spring and the rotary shaft, a lateral thrust force can be exerted on the internal frame to prevent the lens group in rotation from lateral movements, thereby avoiding a deviation of the zoom lens from the preset optical axis and guaranteeing the whole optical performance of the zoom lens.

The acute angle θ may satisfy the condition of 60°≤θ≤80°.

The spring may be a torsional spring.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
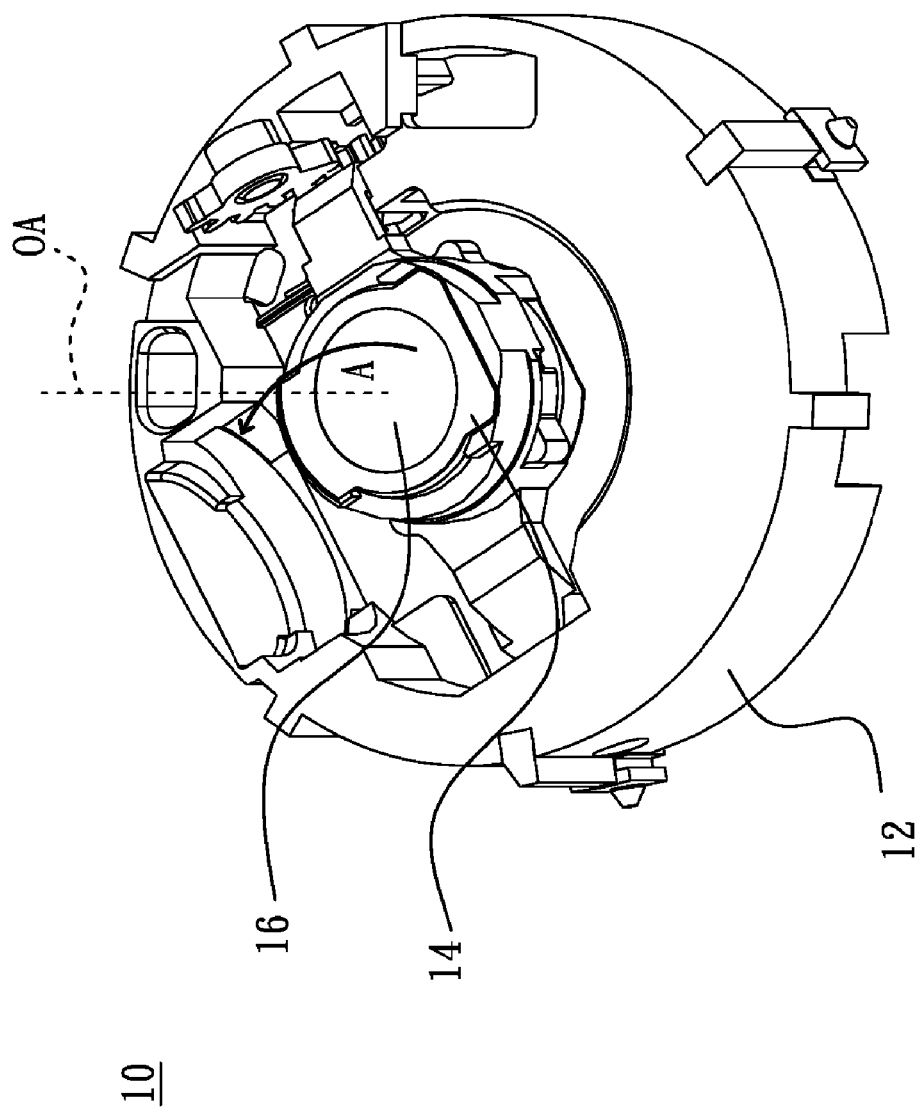
FIG. 1 is a diagram illustrated that one of lens groups of a zoom lens and related components thereof before rotation in accordance with the invention.
Figure 2:
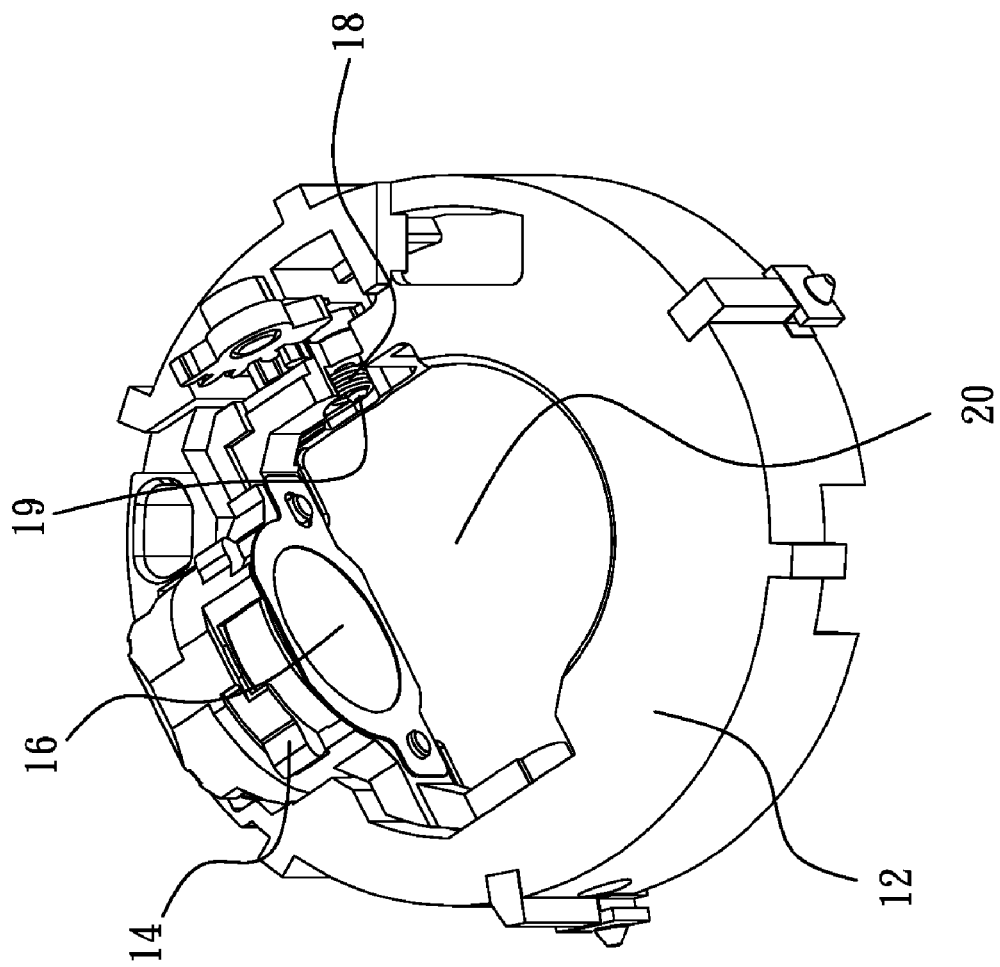
FIG. 2 is a diagram illustrated that one of lens groups of a zoom lens and related components thereof after rotation in accordance with the invention.

The invention provides a zoom lens which includes a plurality of lens groups capable of performing various operations such as zooming and focusing. FIGS. 1 and 2 depict only one lens group 16 and related components thereof, in a zoom lens 10 of the invention. The lens group 16 is fixed in an internal frame 14. The internal frame 14 is connected to an external frame 12 via a rotary shaft 19, so that the internal frame 14 is rotatable relative to the external frame 12.

The external frame 12, the internal frame 14 and the lens group 16 are moved along an optical axis OA when the zoom lens 10 is retracted (in a collapsing operation), and the internal frame 14 and the lens group 16 are rotated in a direction 'A' to leave a space 20 for other lens groups to enter when the lens group 16 is contacted by a stop (not shown in FIGs.), thereby achieving the purpose of miniaturizing the zoom lens 10.

Figure 3:
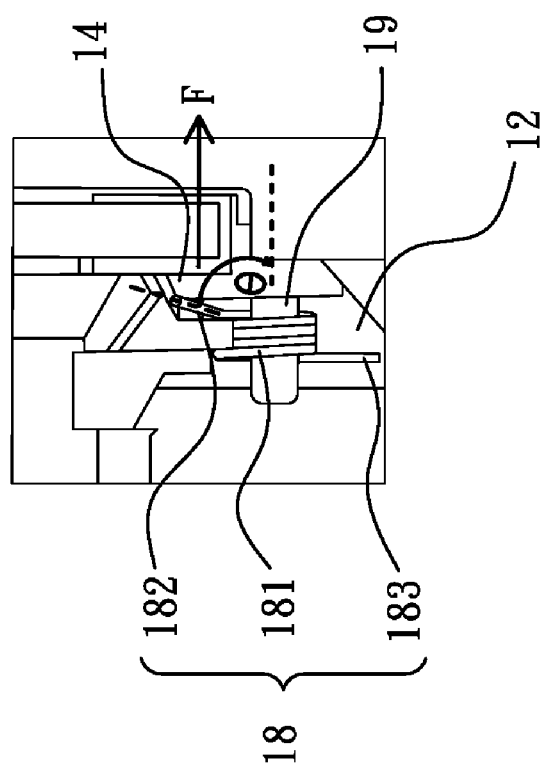
FIG. 3 is an enlarged view of a spring in accordance with the invention.

Referring to FIG. 3, a spring 18 sleeved on the rotary shaft 19 includes a deformation part 181 and two extension parts 182 and 183 extended from the deformation part 181. In this embodiment, the spring 18 is a torsional spring, the extension part 182 of the spring 18 is propped against the internal frame 14, and the extension part 183 of the spring 18 is propped against the external frame 12.

When the zoom lens 10 is performed under the collapsing operation, the internal frame 14 and the lens group 16 are pushed by the stop (not shown in FIGs.) and rotated; meanwhile, the deformation part 181 of the spring 18 is deformed under the torsion action, as shown in FIG. 2. The internal frame 14 and the lens group 16 depart from the stop when the zoom lens 10 is performed under a shooting operation, and the internal frame 14 and the lens group 16 are rotated to return to the position shown in FIG. 1 under the recovery force of the spring 18.

As shown in FIG. 3, the extension part 183 of the spring 18 is extended in the direction perpendicular to the rotary shaft 19, and the extension part 182 of the spring 18 is slightly inclined toward one side at an acute angle θ relative to the rotary shaft 19. With the configuration of the acute angle θ included between the extension part 182 of the spring 18 and the rotary shaft 19, a lateral thrust force F can be exerted on the internal frame 14 to prevent the lens group 16 in rotation from lateral movements, thereby avoiding a deviation of the lens group 16 from the preset optical axis thereof and guaranteeing the whole optical performance of the zoom lens 10. In this embodiment, the acute angle θ satisfies the condition of 60°≤θ≤80°.

In the above-described embodiment, the extension part 182 of the spring 18 propped against the internal frame 14 is utilized to generate the lateral thrust force F, and the extension part 183 of the spring 18 is propped against the external frame 12. It is understood that, the lateral thrust force can still be generated if the extension part 182 of the spring 18 is propped against the external frame 12 and the extension part 183 of the spring 18 is propped against the internal frame 14. Such a reversed arrangement is also capable of preventing the lens group 16 in rotation from lateral movements and avoiding a deviation of the lens group 16 from the preset optical axis thereof.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A zoom lens, comprising:
   an external frame;
   a rotary shaft;
   an internal frame connected to the external frame via the rotary shaft so that the internal frame is rotatable relative to the external frame;
   a lens group fixed in the internal frame; and
   a spring comprising a deformation part and two extension parts extended from the deformation part, wherein one extension part is propped against the internal frame and inclined at an acute angle θ relative to the rotary shaft, and the other extension part is propped against the external frame.

2. The zoom lens as claimed in claim 1, wherein $60° \leq \theta \leq 80°$.

3. The zoom lens as claimed in claim 1, wherein the spring is a torsional spring.

4. A zoom lens, comprising:
   an external frame;
   a rotary shaft;
   an internal frame connected to the external frame via the rotary shaft so that the internal frame is rotatable relative to the external frame;
   a lens group fixed in the internal frame; and
   a spring comprising a deformation part and two extension parts extended from the deformation part, wherein one extension part is propped against the external frame and inclined at an acute angle θ relative to the rotary shaft, and the other extension part is propped against the internal frame.

5. The zoom lens as claimed in claim 4, wherein $60° \leq \theta \leq 80°$.

6. The zoom lens as claimed in claim 4, wherein the spring is a torsional spring.

* * * * *